(12) United States Patent
Galassi et al.

(10) Patent No.: US 8,443,636 B2
(45) Date of Patent: May 21, 2013

(54) HOUSEHOLD APPLIANCE

(75) Inventors: Stefano Galassi, Ranzano (IT); Fabio Spizzo, Cordenons (IT); Marco Giovagnoni, Udine (IT); Fabio Altinier, Codogné (IT)

(73) Assignee: Electrolux Home Products Corporation N.V., Brussels (BE)

( * ) Notice: Subject to any disclaimer, the term of this patent is extended or adjusted under 35 U.S.C. 154(b) by 893 days.

(21) Appl. No.: 12/446,865

(22) PCT Filed: Oct. 18, 2007

(86) PCT No.: PCT/EP2007/009021
§ 371 (c)(1),
(2), (4) Date: Jun. 18, 2009

(87) PCT Pub. No.: WO2008/052660
PCT Pub. Date: May 8, 2008

(65) Prior Publication Data
US 2010/0024491 A1   Feb. 4, 2010

(30) Foreign Application Priority Data

Oct. 31, 2006  (EP) .................................... 06123269

(51) Int. Cl.
*D06F 29/00* (2006.01)
(52) U.S. Cl.
USPC ......................................................... 68/23.1
(58) Field of Classification Search
USPC .......................................... 68/23.1, 23.2, 23.3
See application file for complete search history.

(56) References Cited

U.S. PATENT DOCUMENTS

| 3,580,014 A | * | 5/1971 | Mazza ............................ 68/23.1 |
| 4,418,898 A | | 12/1983 | Atsumi et al. |
| 5,131,619 A | | 7/1992 | Daugherty et al. |
| 5,549,271 A | | 8/1996 | Hamaekers |
| 5,855,353 A | | 1/1999 | Shaffer et al. |
| 5,924,312 A | | 7/1999 | Vande Haar |
| 5,984,233 A | | 11/1999 | Snyder, Jr. et al. |
| 6,315,094 B1 | | 11/2001 | Griffin et al. |
| 2004/0206134 A1 | | 10/2004 | Kim et al. |
| 2005/0172678 A1 | | 8/2005 | Kim et al. |
| 2006/0117812 A1 | | 6/2006 | Wee |
| 2006/0156765 A1 | | 7/2006 | Sunshine et al. |
| 2010/0037660 A1 | | 2/2010 | Hong |

FOREIGN PATENT DOCUMENTS

| DE | 3323148 | 12/1983 |
| DE | 9318373 | 7/1994 |
| DE | 19812363 | 7/1999 |
| JP | 11141605 A | * 5/1999 |

OTHER PUBLICATIONS

Machine Translation of Sekine, JP 11-141605A, May 1999.*
Machine Translation of Morini, DE 3323148 A1, Dec. 1983.*

* cited by examiner

*Primary Examiner* — Michael Barr
*Assistant Examiner* — David Cormier
(74) *Attorney, Agent, or Firm* — Banner & Witcoff, Ltd

(57) ABSTRACT

Laundry washing machine (1) provided with a casing (2) and with a vibration damper (7) which is fixed to the casing (2) so as to reduce vibrations transmitted to the latter; the vibration damper (7) comprising a supporting frame (8) rigidly fixed to the casing (2), an oscillating mass (9) housed inside the supporting frame (8), and at least one block (10) of viscoelastic polymeric gel interposed between the oscillating mass (9) and the supporting frame (8) to floating support the oscillating mass (9).

19 Claims, 1 Drawing Sheet

HOUSEHOLD APPLIANCE

FIELD OF THE INVENTION

The present invention relates to a household appliance.

More specifically, the present invention relates to a laundry washing machine to which the following description refers purely by way of example.

BACKGROUND OF THE INVENTION

As is known, high-speed rotation of the revolving drum of the washing machine produces severe machine vibrations which are transferred to the casing of the washing machine, and which normally become much more problematic as the speed of the revolving drums increases.

To reduce machine vibrations, in today's laundry washing machines the revolving drums is connected in floating manner to the casing by a suspension system designed to partially absorb vibrations before they reach the casing.

In particular installation conditions, however, the floating suspension system fails to sufficiently reduce machine vibrations reaching the casing, so that the washing machine becomes noisy. For example, when a washing machine rests on a flexible floor, such as a wooden floor, a soft floor, or a floor resting on a thin slab, the vibrations generated by the revolving drum during the spin cycle may be resonance-amplified to an unacceptable noise level, and may damage not only the washing machine but also the floor.

To overcame this drawback today's high-end washing machines are also provided with a vibration damper fixed to the casing to reduce vibrations of the washing machine at resonance speeds, and which comprises an oscillating mass and a number of coil springs connecting the oscillating mass to the washing machine casing. The oscillating mass and the coil spring system are properly dimensioned to vibrate, during rotation of the drum, out of phase with respect to vibrations transmitted by the floating suspension system of the drum, thus reducing the amplitude of the casing vibrations.

Unfortunately currently used vibration dampers (traditionally known as "Frahm dampers") only provide for optimum damping performance over a limited range of the possible drum rotation speeds.

SUMMARY OF THE INVENTION

It is an object of the present invention to provide a vibration damper offering optimum performance over almost the full range of the possible drum rotation speeds.

According to the present invention, there is provided a household appliance as claimed in the accompanying Claims.

BRIEF DESCRIPTION OF THE DRAWINGS

A non-limiting embodiment of the present invention will be described by way of example with reference to the accompanying drawings, in which.

DETAILED DESCRIPTION OF ILLUSTRATIVE EMBODIMENTS

Figure 1:
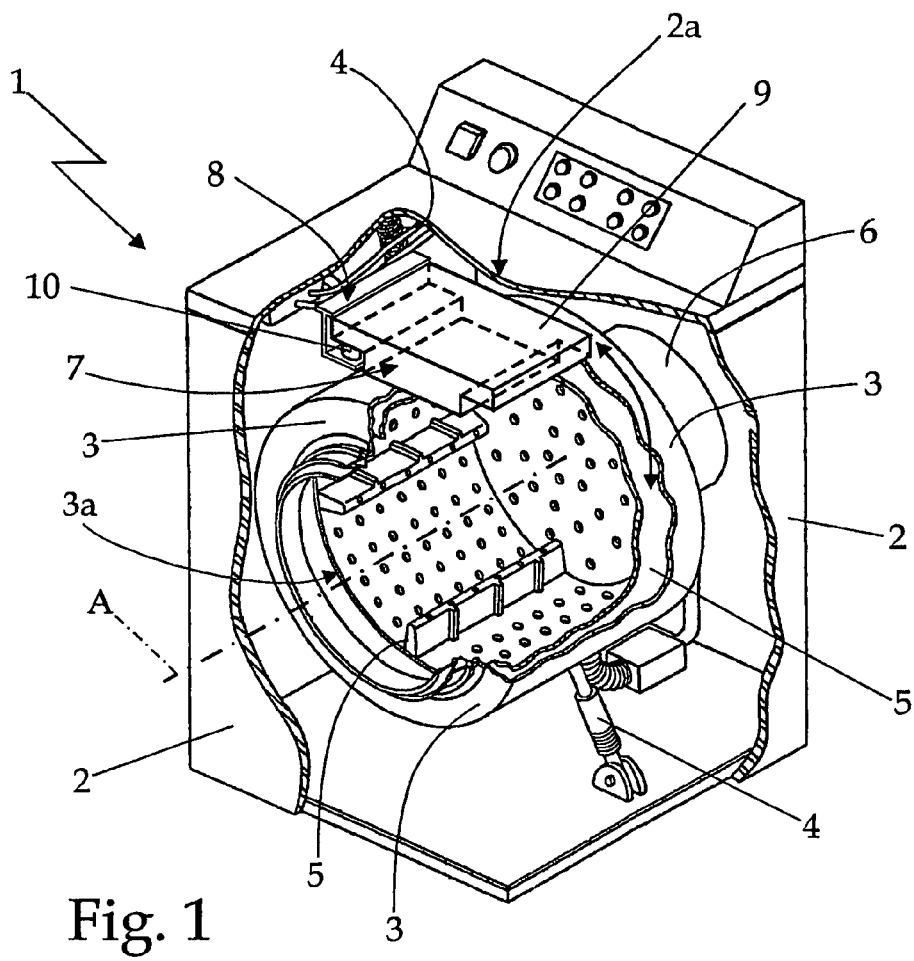
FIG. 1 shows a perspective view, with parts in section and parts removed for clarity, of a laundry washing machine with a vibration damper in accordance with the teachings of the present invention.

Number 1 in the accompanying drawings indicates as a whole a household appliance comprising a casing 2 which is liable to severe machine vibrations during functioning.

More in particular, in the example shown household appliance 1 is a laundry washing machine 1 comprising a casing 2 resting on a floor; a cylindrical washing tub 3 which is connected in floating manner to casing 2 by a suspension system 4; and a revolving drum 5 which is fitted in rotary manner about a horizontal rotation axis A inside tub 3.

Tub 3 is provided with a front opening 3a selectively closable by a door (not shown) hinged to casing 2, and washing machine 1 also comprises an electric motor 6 which is connected to drum 5 by a transmission system so as to rotate, on command, drum 5 about its longitudinal rotation-axis A inside washing tub 3.

Figure 2:
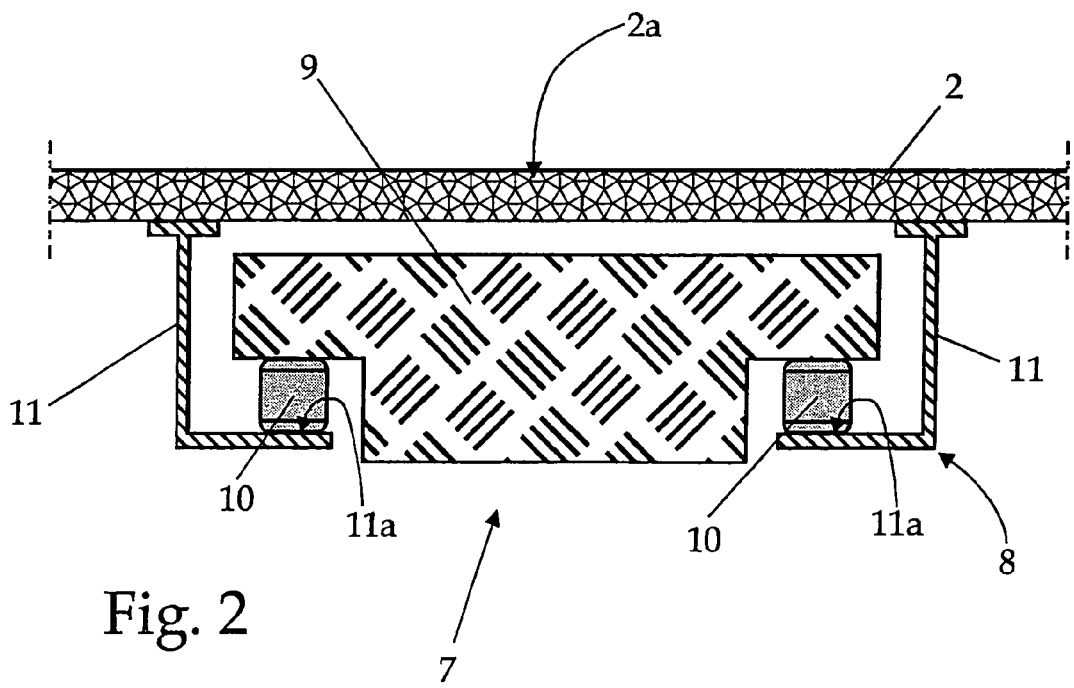
FIG. 2 shows a schematic front view of the vibration damper of the FIG. 1 washing machine.

With reference to FIGS. 1 and 2, household appliance 1, i.e. washing machine 1 also comprises a vibration damper 7 which is fixed to casing 2 to reduce vibrations transmitted to casing 2 by suspension system 4 as drum 5 rotates. More specifically, vibration damper 7 is fixed inside casing 2 preferably, though not necessarily, to the top of casing 2, and comprises a rigid frame 8 fixed rigidly to casing 2; an oscillating mass 9 housed inside frame 8; and at least one elastic supporting member 10 connecting oscillating mass 9 in floating manner to rigid frame 8.

Unlike known solutions, the weight of oscillating mass 9 is 1.5% greater than the total weight of casing 2 without the washing assembly comprising washing tub 3, suspension system 4, revolving drum 5 and electric motor 6; and elastic supporting member 10 comprises at least one monolithic block or piece 10 of viscoelastic polymeric gel with a dynamic elastic modulus G' lower than 300,000 pascals within a frequency range between 5 Hertz and 15 Hertz, and with a dynamic loss factor $\eta$ greater than 0.1 within a frequency range between 5 Hertz and 15 Hertz.

In particular, preferably, though not necessarily, elastic modulus G' of the viscoelastic polymeric gel should be lower than 300,000 pascals within a frequency range between 3 Hertz and 30 Hertz, and loss factor $\eta$ should be greater than 0.1 within a frequency range between 3 Hertz and 30 Hertz.

More specifically, in a preferred embodiment the weight of oscillating mass 9 is 15% greater than the total weight of casing 2 without the washing assembly comprising washing tub 3, suspension system 4, revolving drum 5 and electric motor 6; elastic modulus G' of the viscoelastic polymeric gel is comprised between 10,000 pascals and 100,000 pascals within a frequency range between 5 Hertz and 15 Hertz, and preferably, though not necessarily, within a frequency range between 3 Hertz and Hertz; and loss factor $\eta$ of the viscoelastic polymeric gel is comprised between 0.11 and 0.5 within a frequency range between 5 Hertz and 15 Hertz, and preferably, though not necessarily, within a frequency range between 3 Hertz and 30 Hertz.

Assuming that one end of the material sample (i.e. the viscoelastic polymeric gel) is fixed to a rigid support, that the opposite end of the material sample is subjected to shear deformations due to a sinusoidal (periodic) strain, and that a sinusoidal stress torque is transmitted to the support; the elastic modulus G' is defined by the following formula:

$$G' = \cos\delta\left(\frac{\tau}{\lambda}\right)$$

wherein $\delta$ is the phase angle between strain and stress trends (i.e. phase shift between strain and stress vectors); t is the value of the stress vector; and $\lambda$ is the value of the strain vector.

The value t of the stress vector is defined by the following formula:

$$t = MK_t$$

wherein M is the value of the sinusoidal stress torque transmitted to the support, and $K_t$ is the geometrical stress constant of the tested material sample.

The value λ of the strain vector is defined by the following formula:

$$\lambda = \theta K_\lambda$$

wherein θ is the value of the angular displacement of the end of material sample (i.e. the viscoelastic polymeric gel subjected to the sinusoidal strain, and $K_\lambda$ is the geometrical strain constant of the tested material sample.

Finally the loss factor η is defined by the following formula:

$$\eta = \tan \delta$$

wherein δ is the phase angle between strain and stress trends (i.e. phase shift between strain and stress vectors).

With reference to FIG. 2, in the example shown, rigid frame 8 comprises two rigid L-shaped metal brackets 11 fixed rigidly (e.g. by means of spot welds or screws) to the top 2a of casing 2, and extending vertically, one in front of the other, so that their transverse end portions 11a lie, facing each other, in the same horizontal plane; and oscillating mass 9 is defined by a monolithic prismatic-shaped piece 9 of solid concrete weighing 4.5 kg, located between brackets 11, and resting on end portions 11a of the two brackets 11 with interposition of a number of cylindrical-shaped blocks 10 of viscoelastic polyurethane or silicone gel with an elastic modulus G' of over 25,000 pascals within a frequency range between 5 Hertz and 25 Hertz, and a loss factor η greater than 0.25 within a frequency range between 5 Hertz and 25 Hertz. These cylindrical-shaped blocks 10 define the elastic supporting members 10 of vibration damper 7.

Operation of laundry washing machine 1 and vibration damper 7 can be deduced from the foregoing description with no further explanation required, except to state that, due to the physical features of elastic supporting members 10 of viscoelastic polymeric gel, vibration damper 7 is able to considerably reduce vibration amplitude over a wide range of the possible rotation speeds of revolving drum 5, and it also succeeds in reducing vibration amplitude peaks at resonant frequencies of the washing machine structure by over 50%.

Vibration damper 7, as described above, has numerous advantages: stability and silenceness of the washing machine 1 is strongly increased when the revolving drum 5 reaches its maximum rotation speed after having crossed washing machine resonant vibration frequencies having more than 50% of their amplitude peaks cut off.

Moreover, thanks to a higher weight ratio between the oscillating mass 9 and the washing machine 1, and thanks to softness and high loss factor of the supporting members 10 made of viscoelastic polymeric gel, damping performance of vibration damper 7 remains high over a wider operative range than that of conventional currently used Frahm dampers (i.e. comprising a small oscillating mass and linear coil springs) which, as is known, work fine just at a well defined frequency, but have no effect at other frequencies.

Clearly, changes may be made to vibration damper 7 as described herein without, however, departing from the scope of the present invention. For example, the oscillating mass 9 may rest on rigid frame 8 with the interposition of a single flat pad made of viscoelastic polymeric gel.

According to another embodiment not shown, oscillating mass 9 of vibration damper 7 may be hinged to rigid frame 8 so as to freely swing like a pendulum, and at least one elastic supporting member 10 of viscoelastic polymeric gel connects oscillating mass 9 in floating manner to rigid frame 8.

According to a still further embodiment not shown, vibration damper 7 may comprise two or more oscillating masses 9 resting one on the other with the interposition of at least one elastic supporting member 10 of viscoelastic polymeric gel. In turn the lower oscillating mass 9 rests on rigid frame 8 in floating manner with the interposition of at least one elastic supporting member 10 of viscoelastic polymeric gel.

According to a still further embodiment not shown, vibration damper 7 may comprise two or more oscillating masses 9 resting in floating manner on rigid frame 8 one beside the other with the interposition of at least one elastic supporting member 10 of viscoelastic polymeric gel.

The invention claimed is:

1. A laundry appliance comprising a casing, a rotatable drum mounted within said casing, and a vibration damper fixed to a top side of said casing to reduce vibrations transmitted to the casing; said vibration damper comprising a supporting frame fixed rigidly to said top side of the casing and downwardly depending therefrom, at least one oscillating mass housed inside said supporting frame, and elastic supporting means connecting said oscillating mass to said supporting frame in compression under full weight of said mass; said oscillating mass comprising a body with sides supported on respective underlying surfaces of the supporting frame by a respective portion of said elastic supporting means in compression under weight of said body, said elastic supporting means comprising at least one block of viscoelastic polymeric gel.

2. A laundry appliance as claimed in claim 1, characterized in that said block of viscoelastic polymeric gel has an elastic modulus (G') lower than 300,000 pascals within a frequency range between 5 Hertz and 15 Hertz, and a loss factor (η) greater than 0.1 within a frequency range between 5 Hertz and 15 Hertz.

3. A laundry appliance as claimed in claim 2, characterized in that elastic modulus (G') of said viscoelastic polymeric gel is lower than 300,000 pascals within a frequency range between 3 Hertz and 30 Hertz; and loss factor (η) of said viscoelastic polymeric gel is greater than 0.1 within a frequency range between 3 Hertz and 30 Hertz.

4. A laundry appliance as claimed in claim 1, characterized in that the weight of said oscillating mass is 1.5% greater than the total weight of said casing.

5. A laundry appliance as claimed in claim 1, characterized in that elastic modulus (G') of said viscoelastic polymeric gel is between 10,000 pascals and 100,000 pascals within a frequency range between 5 Hertz and 15 Hertz; and loss factor (η) of said viscoelastic polymeric gel is between 0.1 and 0.5 within a frequency range between 5 Hertz and 15 Hertz.

6. A laundry appliance as claimed in claim 5, characterized in that the weight of said oscillating mass is 15% greater than the total weight of said casing.

7. A laundry appliance as claimed in claim 1, characterized in that said oscillating mass rests on said supporting frame with interposition of said at least one block of viscoelastic polymeric gel.

8. A laundry appliance as claimed in claim 1, characterized in that said at least one block of viscoelastic polymeric gel comprises polyurethane or silicone gel.

9. A laundry appliance as claimed in claim 1, characterized in that said oscillating mass is a monolithic piece of concrete.

10. A laundry appliance as claimed in claim 1, characterized in that it is a laundry washing machine.

11. A laundry appliance comprising a casing, a rotatable drum mounted within said casing, and a vibration damper fixed to an upper side of said casing to reduce vibrations transmitted to the casing; said vibration damper comprising a supporting frame fixed rigidly to said upper side of the casing and downwardly depending therefrom, an oscillating mass, and at least one elastic support connecting said oscillating mass to said supporting frame in compression under full weight of said mass, said oscillating mass comprising a body with sides supported on respective underlying surfaces of the supporting frame by respective portions of said at least one elastic support.

12. A laundry appliance as claimed in claim 11, wherein said frame provides a partial surround of said oscillating mass.

13. A laundry appliance as claimed in claim 11, wherein said oscillating mass comprises a body having a general T-shape in cross-section, with the sides of the top of the "T" being supported on respective underlying surfaces of the supporting frame by a respective said elastic support portion in compression under weight of said body.

14. A laundry appliance as claimed in claim 13, wherein said supporting frame comprises a pair of opposed and spaced brackets, generally L-shaped in cross-section, each supplying a said underlying surface of said supporting frame.

15. A laundry appliance as claimed in claim 13, wherein a central portion of the body extends downwardly between said respective elastic support portions.

16. A laundry appliance as claimed in claim 15, wherein said central portion of the body extends to a point below said supporting frame.

17. A laundry appliance as claimed in claim 13, wherein each said respective elastic support portion comprises a block of viscoelastic polymeric gel.

18. A laundry appliance as claimed in claim 11, wherein said oscillating mass is connected to said supporting frame solely by said at least one elastic support in compression under weight of said mass.

19. A laundry appliance as claimed in claim 11, wherein at least a portion of said oscillating mass is arranged vertically directly above said at least one elastic support, which is placed in compression under weight of said mass.

\* \* \* \* \*